United States Patent [19]
Peters et al.

[11] Patent Number: 5,938,820
[45] Date of Patent: Aug. 17, 1999

[54] AIR AND GAS SCRUBBER USING RECYCLED WATER MIXTURE

[75] Inventors: Rodney W. Peters; Dallas V. Bicknell, both of Holly; Richard D. McKibben, Clarkston; Daniel D. Minor, Cadillac, all of Mich.

[73] Assignee: CMI-Schneible Company, Holly, Mich.

[21] Appl. No.: 08/938,324

[22] Filed: Sep. 26, 1997

Related U.S. Application Data

[60] Provisional application No. 60/027,441, Sep. 27, 1996.

[51] Int. Cl.$^6$ ............................ B01D 47/06; B01D 47/12
[52] U.S. Cl. .............................. 95/186; 95/197; 95/199; 95/205; 96/237; 96/243; 96/267
[58] Field of Search .................. 95/186, 189, 195–197, 95/199, 200, 202, 205; 96/236–239

[56] References Cited

U.S. PATENT DOCUMENTS

| | | | |
|---|---|---|---|
| 1,493,579 | 5/1924 | Walter . | |
| 1,786,150 | 12/1930 | Cutler . | |
| 1,932,525 | 10/1933 | Jacobson et al. . | |
| 2,014,044 | 9/1935 | Haswell | 95/195 X |
| 2,080,713 | 5/1937 | Hayes | 261/110 |
| 2,090,142 | 8/1937 | Nonhebel et al. | 95/195 X |
| 2,141,829 | 12/1938 | Schneible | 261/18 |
| 2,259,031 | 10/1941 | Fisher | 261/21 |
| 2,259,032 | 10/1941 | Fisher | 261/21 |
| 2,259,033 | 10/1941 | Fisher | 261/21 |
| 2,354,674 | 8/1944 | Fisher | 261/79.2 |
| 2,575,359 | 11/1951 | Ortgies | 96/237 |
| 2,585,440 | 2/1952 | Collins | 96/237 |
| 2,596,106 | 5/1952 | Schneible | 261/79 |
| 2,838,135 | 6/1958 | Pilo et al. | 95/189 |
| 2,886,298 | 5/1959 | Ludy et al. | 261/14 |
| 3,456,709 | 7/1969 | Vegeby | 95/199 X |
| 3,577,709 | 5/1971 | Hoad | 96/237 |
| 3,618,299 | 11/1971 | Vincent | 55/236 |
| 3,620,509 | 11/1971 | Roman | 261/18 B |
| 3,624,984 | 12/1971 | Ferrari et al. | 95/199 |
| 3,733,788 | 5/1973 | Crowley | 96/236 X |
| 3,791,109 | 2/1974 | Gustavsson | 96/237 |
| 3,793,389 | 2/1974 | Oleszko et al. | 95/199 X |
| 3,918,940 | 11/1975 | Westlake et al. | 96/237 X |
| 3,989,488 | 11/1976 | Wisting | 96/237 |
| 4,003,723 | 1/1977 | Schafer et al. | 55/71 |
| 4,013,455 | 3/1977 | Kleeberg et al. | 95/189 X |
| 4,039,304 | 8/1977 | Bechthold et al. | 55/10 |
| 4,157,250 | 6/1979 | Regehr et al. | 55/233 |
| 4,234,389 | 11/1980 | Lynn et al. | 201/30 |
| 4,251,236 | 2/1981 | Fattinger et al. | 95/197 |
| 4,256,468 | 3/1981 | Mazer et al. | 95/199 X |
| 4,312,646 | 1/1982 | Fattinger et al. | 96/239 |
| 4,488,884 | 12/1984 | Parigi | 55/71 |
| 5,660,615 | 8/1997 | Neumann et al. | 95/202 X |
| 5,665,129 | 9/1997 | Okazoe et al. | 96/237 X |

*Primary Examiner*—Robert Spitzer
*Attorney, Agent, or Firm*—Varnum, Riddering, Schmidt & Howlett llp

[57] ABSTRACT

A gas cleaning apparatus is disclosed which comprises a housing having an inlet adjacent a bottom portion thereof and an outlet adjacent a top portion thereof. The housing preferably has at least one radially-extending vane disposed along a longitudinal axis of the housing. A settling tank is fluidly connected at a top portion thereof to the base of the housing, at least one outlet fluidly connected to a waste treatment apparatus, and at least one outlet fluidly connected to the housing between the inlet and the outlet of the housing. The waste treatment apparatus preferably has at least one outlet fluidly connected to the housing between the inlet and the outlet of the housing. Gas introduced into the inlet of the housing travels toward the outlet and encounters the at least one radially-extending vane which removes any large particles from the gas, and recycled fluid is introduced into the gas from the outlet of the settling tank and the outlet of the waste treatment apparatus to remove smaller particles therefrom.

15 Claims, 1 Drawing Sheet

AIR AND GAS SCRUBBER USING RECYCLED WATER MIXTURE

CLAIM OF PRIORITY

This application claims priority pursuant to 35 U.S.C. § 119 of U.S. provisional patent application Ser. No. 60/027,441, filed Sep. 27, 1996.

BACKGROUND OF THE INVENTION

1. Field of the Invention

This invention relates to an air and gas washer or scrubber which is adapted to remove dirt, dust, gases, and other impurities from an air flow with the use of a fluid and, more particularly, to a cyclonic flow scrubber which utilizes some recycled fluid in the scrubbing process.

2. Description of Related Art

It has been long known in the art to provide a cyclonic scrubbing tower having an inlet which receives a stream of "dirty" fluid, such as air, wherein the air is "washed" by removing large and small particles alike from the entering air stream. The entering air stream is typically passed upwardly in the tower in a cyclonic fashion which tends to fling larger particles in the air stream outwardly. In addition, a stream of fluid (such as water or oil) is passed into the air stream which catches smaller particles contained therein. A scrubbing tower of this type is shown in U.S. Pat. No. 2,354,674 to Fisher, U.S. Pat. No. 2,259,033 to Fisher, and U.S. Pat. No. 2,141,829 to Schneible. The disclosures of these several references is expressly incorporated herein by reference.

These types of scrubbing towers typically introduce clean fluid into the entering air stream to catch the entrained particles. The fluid is pumped from a source into the scrubbing tower and allowed to drain out of the bottom of the tower. Introducing a continuous stream of clean fluid into the scrubbing tower is costly to maintain.

It is also known in the prior art to provide an outlet conduit from the scrubbing tower which is fluidly interconnected with a pump. The pump transports any fluid entering the outlet conduit to an upstream portion of the scrubbing tower to recycle the cleaning fluid therein. An example of such a scrubbing tower is shown in U.S. Pat. No. 2,141,829 to Schneible, issued Dec. 27, 1938.

SUMMARY OF INVENTION

The gas cleaning apparatus according to the invention overcomes problems of the prior art by providing a scrubbing tower with enhanced fluid recycling capabilities during the cleaning process. Through the recycling, a smaller volume of clean fluid is required without materially impacting the effectiveness of the gas cleaning apparatus.

In one aspect, the invention is directed to an improved gas cleaning apparatus comprising a housing with a gas inlet, a gas outlet, a fluid inlet, and a fluid outlet. The improvement in the gas cleaning apparatus is a recycling conduit which fluidly interconnects the fluid outlet of the housing and the fluid inlet of the housing. With this structure, at least a portion of the fluid exiting the housing through the fluid outlet is recycled back into the housing for use in the cleaning process. In a preferred embodiment, a settling tank having an inlet and an outlet is fluidly connected to the fluid outlet of the housing. The recycling conduit is provided intermediate the outlet of the settling tank and the fluid inlet of the housing. Preferably, the settling tank has a conical portion which is adapted to collect impurities through the force of gravity and conduct these impurities to a waste treating apparatus.

In another aspect, the invention is directed to a method for cleaning gas comprising the steps of first, providing a housing having a gas inlet, a gas outlet, a fluid inlet, and a fluid outlet. At least one vane is provided intermediate the gas inlet and gas outlet. The fluid outlet of the housing is fluidly connected to the fluid inlet of the housing so that at least a portion of the fluid exiting the housing through the fluid outlet is recycled back into the housing through the fluid inlet.

BRIEF DESCRIPTION OF THE DRAWINGS

The invention will now be described with reference to the drawings wherein.

DESCRIPTION OF THE PREFERRED EMBODIMENTS

Figure 1:
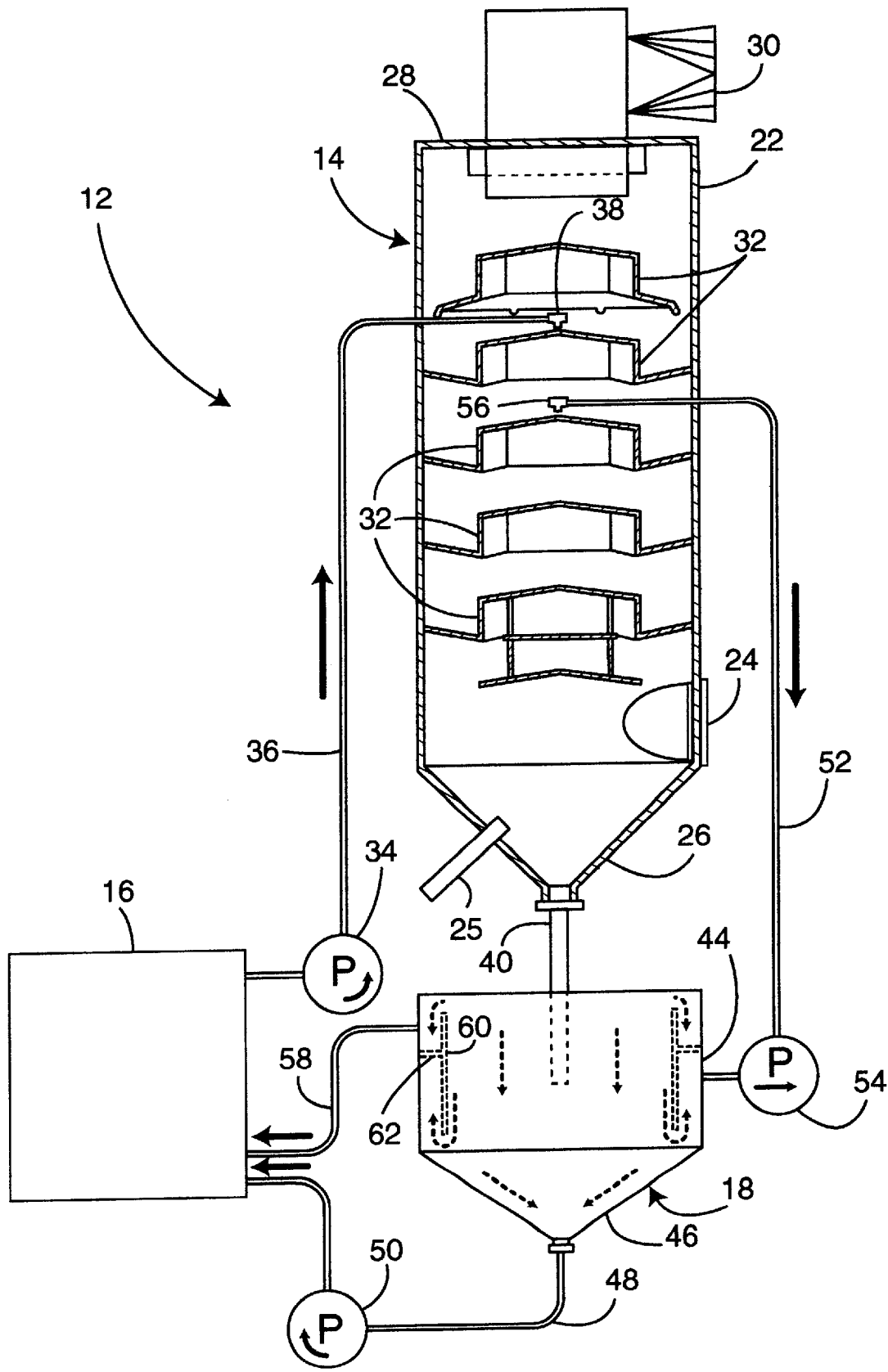
FIG. 1 is a schematic view of an air and gas scrubber according to the invention.

Referring now to the drawings, FIG. 1 is a schematic view of one embodiment of an air and gas scrubber 12 according to the invention. In the preferred embodiment, the scrubber system 12 comprises an impurity collector 14, a waste treatment apparatus 16, and a recirculation/settling tank 18.

The basic structure of the impurity collector 14 is well known in the art and comprises a circular housing 22 having an air inlet 24 provided tangentially adjacent a base of the housing 22, a cone-shaped base 26 on the bottom of the housing 22, and a top wall 28 having an air discharge 30 provided adjacent the top wall 28 of the housing 22. A plurality of vane members 32 are staggered along the length of the housing 22 between the air inlet 24 and the air discharge outlet 30 and the vane members 32 are adapted to disturb the cyclonic air flow within the housing 22. In the particular embodiment of an air and gas scrubber 12 in accordance with the invention as shown in FIG. 1, the number of vane members 32 is five, although a different number of vane members may be utilized. Typically, the uppermost vane number 32 shown in FIG. 1 would be referred to as the number 1 vane, while the lowermost vane number 32 in the particular embodiment shown in FIG. 1 would be referred to as the number 5 vane member. In addition to the foregoing elements, the air and gas scrubber 12 may include an overflow pipe or valve 25 incorporated within the cone-shaped base 26 on the bottom of the housing 22.

The primary distinction between the scrubber system 12 according to the invention and that of the prior art is the structure and process for introducing fluids into the system. In the subsequent description of the air and gas scrubber 12 in accordance with the invention, the cleansing fluid will be described as clean water. However, it should be emphasized that various other types of fluids may be utilized, without departing from the spirit and scope of the concepts of the invention. With this understanding, and turning to the preferred embodiment, clean water is provided to the collector housing 22 through a pump 34 and fluid conduit 36. The conduit 36 extends from a fluid outlet 38 provided at one end thereof to a source of clean water such as the waste treatment apparatus 16 provided at the other end thereof The waste treatment apparatus 16 supplies either clean, unused water to the system or, alternatively, supplies water which has been purified and otherwise cleansed. The "clean water" is discharged through the fluid outlet 38 into the collector housing 22 and passes over the vane members 32 into contact with the air flowing between the inlet 24 and outlet 30. The water and contaminant solution eventually drains down into the base 26 and exits the housing through a drain conduit 40. The drain conduit 40 terminates at the recirculation/settling tank 18. The tank 18 preferably comprises a circular housing 44 having a conical-shaped base 46 formed on the bottom thereof. As the collected water and impurities from the housing 22 are received in the recirculation/settling tank 18, the largest impurities will, through the force of gravity, settle to the bottom of the conical base 46 and eventually be drawn through a conduit 48 and pump 50 to the waste treatment apparatus 16 for appropriate disposal. In addition to the use of the pump 50, and as an alternative thereto, it is also possible to configure the waste treatment apparatus 16 and recirculation/settling tank 18 so that the pump 50 is unnecessary and the impurities could be drawn to the waste treatment apparatus 16 through a "gravity feed" arrangement. Gravity feed arrangements are relatively well-known in the art.

A recirculation conduit 52 and pump 54 extend from the side wall of the housing 44 of the tank 18. One end of the conduit 52 supports a fluid outlet 56 positioned inside the collector housing 22, preferably below and upstream from the clean water fluid outlet 38. The other end of the conduit 52 is fluidly connected to the tank 18. The pump 54 draws dirty water from the recirculation/settling tank 18 and reintroduces it into the collector housing 22 for reuse in the air scrubbing process.

An overflow conduit 58 fluidly connects the settling tank 18 and the waste treatment apparatus 16. The overflow conduit 58 is preferably mounted to the settling tank 18 at an upper portion thereof and delivers fluid to the waste treatment apparatus 16 when the level in the tank 18 has reached a predetermined level. To aid the flow of fluid into the overflow conduit 58, the settling tank 18 can be provided with an annular vane 60 which is mounted to the housing 44 of the settling tank 18 via a connector flange 62. The connector flange 62 is mounted between the vane 62 and the housing 44 below an inlet of the overflow conduit 58 into the settling tank 44. The height of the vane 60 and the height of the connector flange 62 relative to the overflow conduit 58 define the amount of fluid to be contained in the settling tank 18 before fluid can flow over the vane 60, onto the connector flange 62, and eventually into the waste treatment apparatus 16 via the overflow conduit 58.

With this structure, an air scrubbing system 12 is created which will make more efficient and cost effective use of water in the scrubbing process. The known scrubbing processes all use clean or virgin water for the scrubbing operation. However, testing has shown that the dirty air can be effectively cleansed by using a blend of clean water and recycled or used water. In the structure shown in FIG. 1, the recycled water acts as a macro-filter for collecting the largest of the dirt, dust, and other impurities and the clean water, introduced at a position intermediate the recycled water discharge nozzle 56 and the air outlet 30, acts as a micro-filter to remove the smaller impurities which escape the macro filter. The combination or blending of the clean and dirty water effectively removes the impurities while reducing the demands for clean water for operation of the system. This type of system is very beneficial in areas where the availability of clean water is limited or extremely costly.

It will be understood that the sequence of introduction of clean and/or dirty water into the air stream can be altered without departing from the scope of this invention. For example, one or more clean water inlets can be provided to the housing 22, one or more recycled or "dirty" water inlets can be provided, or some alternating sequence of clean and dirty water inlets in any order can be provided, depending upon the filtering requirements of the user. Alternatively, the system can be designed to use only recycled water, thereby eliminating the need for a virgin water inlet.

While particular embodiments of the invention have been shown, it will be understood, of course, that the invention is not limited thereto since modifications may be made by those skilled in the art, particularly in light of the foregoing teachings. Reasonable variations and modifications are possible within the scope of the foregoing disclosure of the invention, without departing from the spirit of the invention.

The embodiments of the invention in which an exclusive property or privilege is claimed are defined as follows:

1. A method for cleaning gas comprising the steps of
   providing a housing forming a single interior chamber and having a gas inlet and a gas outlet, whereby gas to be cleaned flows in a first direction from said gas inlet to said gas outlet;
   discharging a first fluid from a first fluid discharge located within the chamber intermediate the gas inlet and gas outlet;
   providing a fluid outlet spaced apart from the first fluid discharge;
   discharging a second fluid from a second fluid discharge located within the chamber intermediate the first fluid discharge and the fluid outlet, the second fluid discharge being structured so that the second fluid discharged therefrom is initially discharged and moves in a second direction opposing the flow of gas in the first direction, and operates to cleanse the gas while flowing in the second direction;
   disturbing the cyclonic flow of the gas and assisting in mixing together the gas and the first and second fluids through the use of at least one vane positioned within the chamber intermediate the gas inlet and the gas outlet;
   discharging the first and second fluids into the single chamber so that fluids can mix together within the single chamber, while providing the single chamber in a manner so that the single chamber is devoid of any structure blocking the flow of the first and second fluids, other than the at least vane;
   fluidly interconnecting the fluid outlet of the housing to the second fluid discharge of the housing;
   whereby at least a portion of the fluid exiting the housing through the fluid outlet is recycled into the housing through the second fluid discharge.

2. A gas cleaning apparatus comprising a housing forming a single interior chamber and having a gas inlet and a gas outlet, whereby gas to be cleaned flows in a first direction from said gas inlet to said gas outlet, the apparatus further comprising:
   a first fluid discharge for discharging a first fluid and located intermediate the gas inlet and gas outlet;
   a fluid outlet spaced from the first fluid discharge;
   a second fluid discharge for discharging a second fluid and positioned intermediate the first fluid discharge and the fluid outlet, said second fluid discharge being structured so that the second fluid discharged therefrom is initially discharged and moves in a second direction opposing the flow of the gas in the first direction, and operates to cleanse the gas while flowing in the second direction;
   a recycling conduit fluidly interconnecting the fluid outlet and the second fluid discharge;

mixing means positioned within said chamber for disturbing cyclonic flow of the gas and assisting in mixing together the gas and the first and second fluids;

the first fluid discharge and the second fluid discharge are both enclosed within the single chamber of the housing and discharge the first and second fluids into the chamber so that the fluids can mix together within the single chamber; and the single chamber is devoid of an structure blocking the flow of the first second fluids, other than mixing means.

3. The gas cleaning apparatus of claim 2 and further comprising a settling tank having an inlet and an outlet, the inlet of the settling tank being fluidly connected to the fluid outlet of the housing and the recycling conduit being provided intermediate the outlet of the settling tank and the first fluid discharge of the housing.

4. The gas cleaning apparatus of claim 3 and further comprising a waste treatment apparatus having an inlet and an outlet, the inlet of the waste treatment apparatus being fluidly connected to the outlet of the settling tank and the outlet of the waste treatment apparatus being fluidly connected to the first fluid discharge of the housing whereby the waste treatment apparatus cleans fluid passing therethrough.

5. The gas cleaning apparatus of claim 3 wherein the settling tank is fluidly connected to a source of liquid.

6. The gas cleaning apparatus of claim 3 wherein the settling tank comprises a conical portion adapted to collect impurities through the force of gravity.

7. The gas cleaning apparatus of claim 6 wherein the conical portion has an apex and the outlet of the settling tank is mounted to the apex.

8. The gas cleaning apparatus of claim 7 wherein the outlet of the settling tank is fluidly connected to a waste treatment apparatus.

9. The gas cleaning apparatus of claim 8 and further comprising means fluidly connected between the settling tank and the waste treatment apparatus for drawing liquid and waste material through the outlet of the settling tank and toward the waste treatment apparatus.

10. The gas cleaning apparatus of claim 9, wherein the means comprises a pump.

11. The gas cleaning apparatus of claim 9, wherein the means comprises a gravity feed arrangement.

12. The gas cleaning apparatus of claim 2 and further comprising a waste treatment apparatus having an inlet and an outlet, the inlet of the waste treatment apparatus being fluidly connected to the fluid outlet of the housing and the outlet of the waste treatment apparatus being fluidly connected to the first fluid discharge of the housing, whereby the waste treatment apparatus cleans fluid passing therethrough.

13. The gas cleaning apparatus of claim 2 wherein the gas inlet of the housing is located at a bottom portion thereof.

14. The gas cleaning apparatus of claim 2 wherein the gas outlet of the housing is located at a top portion thereof.

15. The gas cleaning apparatus of claim 2 wherein the housing includes a conical portion having an apex and the housing fluid outlet is provided at the apex of the conical portion.

\* \* \* \* \*